G. KRATZMANN.
TRANSPORTABLE POTATO HOLE DIGGING MACHINE.
APPLICATION FILED JULY 28, 1913.

1,093,938.  Patented Apr. 21, 1914.

Witnesses  Inventor

Gustav Kratzmann

UNITED STATES PATENT OFFICE.

GUSTAV KRATZMANN, OF BARSBÜTTEL, ALTRAHLSTEDT, GERMANY.

TRANSPORTABLE POTATO-HOLE-DIGGING MACHINE.

1,093,938.   Specification of Letters Patent.   Patented Apr. 21, 1914.

Application filed July 28, 1913. Serial No. 781,558.

*To all whom it may concern:*

Be it known that I, GUSTAV KRATZMANN, a subject of the King of Prussia, and resident of Barsbüttel, in the District of Altrahlstedt, in the Province of Schleswig-Holstein, Germany, farmer, have invented a new and useful Improved Transportable Potato-Hole-Digging Machine, of which the following is a specification.

The present invention relates to an improved potato-plant-hole digging machine, which is provided with digging implements, interchangeable and adjustable at the circumference of one of the wheels.

The characteristic feature of the invention consists in having the digging implements fixed radially adjustable in regard to the wheel, so that with one and the same kind of digging implements holes of variable depth can be produced in accordance with the class of potatoes and the soil to be planted.

Another characteristic feature of the invention consists in having the bi-convex shaped digging implements of larger convexity at the front than at the rear, so that the wall bordering the plant hole at the front by being smoothened up to the edge is safeguarded against falling-in, whereas the wall bordering the plant hole at the rear is loosely produced.

At the tip of the digging implements is interchangeably attached a shovel blade, by means of which the plant hole is emptied from the sand that might have fallen-in during the formation of the hole.

The improved potato-plant-hole digging machine, which in view of its simple construction can be sold at a moderate price, makes no special claim to cleverness and attentiveness in properly fitting up and using same.

In the annexed drawing is shown by way of example, one mode of carrying into practice the invention.

Figure 1:
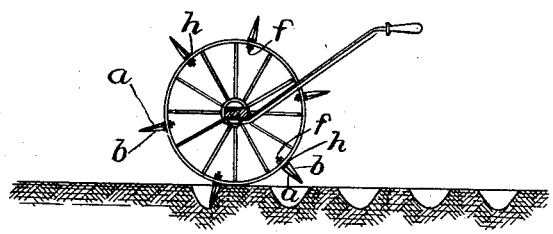
Figure 2:
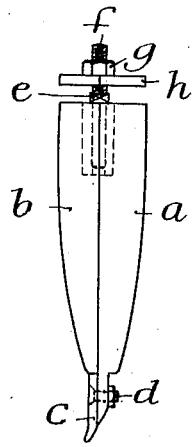
Figure 3:
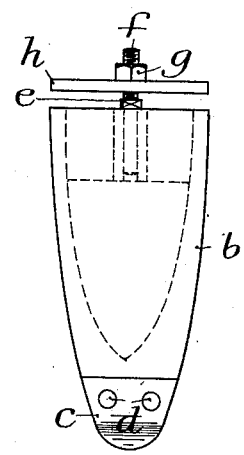
Figure 4:
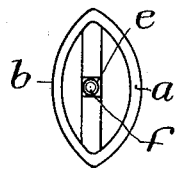
Figure 5:
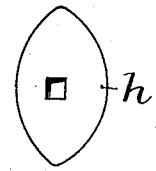

Figure 1 is a side elevation of the improved potato-plant-hole digging machine. Fig. 2 is a side elevation of one of the digging implements. Fig. 3 is a rear elevation of one of the digging implements. Fig. 4 is a plan view of the digging implement shown in Fig. 3 after taking off the top plate. Fig. 5 is a plan view of the top plate of the digging implement shown in Fig. 3.

The potato-plant-hole digging machine consists essentially of a frame mounted on two wheels, one of which latter is fitted up for digging the plant holes. In the metallic rim of this wheel are series of holes for the interchangeable and adjustable attachment of the digging implements. The digging implements comprise hollow cast metal bodies of bi-convex shape, the front $a$ of which is of larger convexity than the rear $b$. The convexity at the front $a$ is so chosen, that the hole formed in using the implement shows a tight wall at the front up to the edge due to the pressure of the front part $a$ and is thus safeguarded against falling-in. At the tip of the digging implements is interchangeably attached a shovel blade $c$, which acts with the rear part $b$ and serves for emptying the hole from the sand that might have fallen in while the hole was being formed. The shovel blade $c$, to serve its purpose efficiently, is slightly bent toward the rear as shown in Fig. 2. The shovel blade $c$, which is attached by means of screw bolts $d$ to the tip of the digging implements, registers flush with the rear part $b$ and with the circumferential edge of the digging implements, thus determining the shape of the hole at the bottom thereof.

The attachment of the digging implements to the wheel of the machine is effected by means of the shaft $e$ cast integral with the bi-convex body $a$, $b$. This shaft $e$ receives and firmly holds in a screw-threaded bore a screw bolt $f$. It is advantageous to form the shaft $e$ at its end projecting above the bi-convex body $a$, $b$ square or otherwise polygonal and to shape the holes in the rim of the wheel similarly square or polygonal, so that in this manner the digging implements are secured against rotation when fastened to the rim of the wheel. Other suitable means may however be provided for locking the digging implements against rotation when attached to the rim of the wheel. The screw bolts $f$ of the shafts $e$ penetrating through the holes in the rim of the wheel receive nuts $g$, which by tightening obtain a rigid fastening of the digging implements to the wheel.

In order to enable the digging implements to be radially adjustable in regard to the wheel carrying same, for the purpose of enabling holes of variable depth to be dug, to suit the various kinds of potatoes and soil, the shaft $e$ accommodates a disk $h$ provided with a hole for the penetration of the shaft. To produce deeper holes, this disk *h* rests against the circumference of the wheel, in this case also serving as a lid for the biconvex body *a, b* protecting same against the entrance of sand and the like. To produce shallow holes, this disk *h* rests against the inner surface of the rim of the wheel adjacent to the nut *g*. In this case the bi-convex body *a, b* is covered by the rim of the wheel. The employment of disks of various thickness or of several disks together enables the digging implements to be radially adjusted to any desired degree.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims, or of mechanical equivalents to the structure set forth.

What I do claim as my invention, and desire to secure by Letters Patent, is:

1. Improved transportable potato-plant-hole digging machine comprising, in combination with the rim of one of the wheels, interchangeable and adjustable digging implements, which are radially adjustable in regard to the wheel, substantially as and for the purposes set forth.

2. Improved transportable potato-plant-hole digging machine, which comprises in combination with one of the wheels interchangeable and adjustable digging implements, said digging implements consisting of bi-convex bodies of larger convexity at the front than at the rear, substantially as and for the purposes set forth.

3. Improved transportable potato-plant-hole digging machine, which comprises, in combination with one of the wheels, interchangeable and adjustable digging implements of bi-convex shape, a shovel blade being attached at the tip of the digging implements, substantially as and for the purposes set forth.

4. Improved transportable potato-plant-hole digging machine, which comprises, in combination with one of the wheels, interchangeable and adjustable digging implements of bi-convex shape, a shovel blade being attached at the tip of the digging implements, said shovel blade registering flush with the rear surface and with the marginal edge of the digging implements, substantially as and for the purposes set forth.

In witness whereof, I have hereunto signed my name this 14th day of July, 1913, in the presence of two subscribing witnesses.

GUSTAV KRATZMANN.

Witnesses:
LEOPOLD SKOPETZLER,
ERNEST H. L. MUMMENHOFF.

---

Copies of this patent may be obtained for five cents each, by addressing the "Commissioner of Patents, Washington, D. C."